US012752529B2

(12) United States Patent
Yamashita et al.

(10) Patent No.: US 12,752,529 B2
(45) Date of Patent: Oct. 6, 2026

(54) INK JET RECORDING METHOD AND INK JET RECORDING APPARATUS

(71) Applicant: CANON KABUSHIKI KAISHA, Tokyo (JP)

(72) Inventors: Tomohiro Yamashita, Kanagawa (JP); Hiroshi Kakikawa, Kanagawa (JP); Tomoaki Ishii, Saitama (JP); Kenichi Shiiba, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 160 days.

(21) Appl. No.: 18/337,762

(22) Filed: Jun. 20, 2023

(65) Prior Publication Data

US 2023/0405990 A1 Dec. 21, 2023

(30) Foreign Application Priority Data

Jun. 20, 2022 (JP) ................................ 2022-098877
Jun. 14, 2023 (JP) ................................ 2023-097946

(51) Int. Cl.
*B41J 2/165* (2006.01)
*B41J 2/14* (2006.01)
*B41M 5/00* (2006.01)

(52) U.S. Cl.
CPC ......... *B41J 2/14032* (2013.01); *B41J 2/1652* (2013.01); *B41J 2/16526* (2013.01); *B41M 5/0023* (2013.01)

(58) Field of Classification Search
CPC .................. B41J 2/14032; B41J 2/1652; B41J 2/16526; B41M 5/0023
See application file for complete search history.

(56) References Cited

U.S. PATENT DOCUMENTS

| | | | |
|---|---|---|---|
| 6,257,714 | B1 | 7/2001 | Seccombe |
| 6,419,343 | B1 | 7/2002 | Taylor et al. |
| 6,513,904 | B1 | 2/2003 | Taylor et al. |
| 7,160,372 | B2 | 1/2007 | Yoshizawa |
| 7,226,498 | B2 | 6/2007 | Yamashita |
| 7,247,194 | B2 | 7/2007 | Okamura |
| 7,270,701 | B2 | 9/2007 | Jinnou |
| 7,297,197 | B2 | 11/2007 | Jinnou |

(Continued)

FOREIGN PATENT DOCUMENTS

| | | | |
|---|---|---|---|
| JP | 2000033711 | A | 2/2000 |
| JP | 2000238277 | A | 9/2000 |

(Continued)

*Primary Examiner* — Yaovi M Ameh
(74) *Attorney, Agent, or Firm* — Venable LLP

(57) ABSTRACT

Provided is an ink jet recording method including recording an image on a recording medium through use of an ink jet recording apparatus, the inkjet recording apparatus including: an aqueous ink; a recording head including an ink flow path in which the aqueous ink flows and including an ejection orifice configured to eject the aqueous ink; and a recovery mechanism configured to recover an ejection state of the aqueous ink from the ejection orifice by applying a pressure to the ink flow path inside the recording head. The aqueous ink contains resin particles each dyed with a basic dye exhibiting fluorescence and a water-soluble resin. The resin particles are each formed of a resin having an anionic group-containing unit. The water-soluble resin has an anionic group-containing unit.

11 Claims, 4 Drawing Sheets

(56) References Cited

U.S. PATENT DOCUMENTS

| | | | |
|---|---|---|---|
| 7,550,037 | B2 | 6/2009 | Mafune |
| 7,611,571 | B2 | 11/2009 | Yamashita |
| 8,075,126 | B2 | 12/2011 | Yoshizawa |
| 8,616,695 | B2 | 12/2013 | Mori |
| 8,998,397 | B2 | 4/2015 | Mori |
| 9,169,413 | B2 | 10/2015 | Shiiba |
| 9,388,322 | B2 | 7/2016 | Kakikawa |
| 9,452,608 | B2 | 9/2016 | Okamura |
| 9,562,165 | B2 | 2/2017 | Mori |
| 9,574,099 | B2 | 2/2017 | Kawabe |
| 9,809,721 | B2 | 11/2017 | Yamamoto |
| 9,957,399 | B2 | 5/2018 | Okazaki |
| 10,233,343 | B2 | 3/2019 | Takebayashi |
| 10,240,053 | B2 | 3/2019 | Nushiro |
| 10,253,197 | B2 | 4/2019 | Shiiba |
| 10,253,200 | B2 | 4/2019 | Kakikawa |
| 10,259,963 | B2 | 4/2019 | Masada |
| 11,584,864 | B2 | 2/2023 | Umesato et al. |
| 11,654,693 | B2 | 5/2023 | Saito |
| 2014/0375725 | A1* | 12/2014 | Sameshima ............ B41J 2/1606 347/45 |
| 2017/0341396 | A1* | 11/2017 | Ozawa ..................... B41J 2/035 |
| 2021/0198504 | A1 | 7/2021 | Umesato |
| 2022/0024218 | A1 | 1/2022 | Yamashita |
| 2022/0024219 | A1 | 1/2022 | Motomura |
| 2022/0184970 | A1 | 6/2022 | Kusada |
| 2022/0242155 | A1 | 8/2022 | Tajima |
| 2023/0183509 | A1 | 6/2023 | Kusada |

FOREIGN PATENT DOCUMENTS

| | | | | | |
|---|---|---|---|---|---|
| JP | 2000238294 | A | | 9/2000 | |
| JP | 2003113332 | A | | 4/2003 | |
| JP | 2020050874 | A | | 4/2020 | |
| JP | 2021008598 | A | * | 1/2021 | .......... B41J 2/17553 |

* cited by examiner

INK JET RECORDING METHOD AND INK JET RECORDING APPARATUS

BACKGROUND OF THE INVENTION

Field of the Invention

The present invention relates to an ink jet recording method and an ink jet recording apparatus.

Description of the Related Art

With an ink jet recording method, images, such as photographs and documents, can be recorded on various recording media. In addition, there have been proposed various inks in accordance with purposes, such as an ink suitable for recording an image of photographic quality on glossy paper and an ink suitable for recording a document or the like on plain paper. In recent years, for use in posters and signs, there is an increasing demand for recorded products on which images having high color development, such as an image exhibiting fluorescence, are recorded. As an ink for recording an image exhibiting fluorescence, there has been proposed an ink containing a fluorescent dye (Japanese Patent Application Laid-Open No. 2003-113332).

In addition, there is also an increasing demand for the efficient use of an ink. In order to satisfy such demands and suppress the generation amount of a waste ink (ink to be used for purposes other than recording), there has been proposed, for example, a recording apparatus in which a pressure recovery system that performs a recovery operation by pressurization is incorporated (Japanese Patent Application Laid-Open No. 2000-238277).

SUMMARY OF THE INVENTION

The present invention is to solve a problem occurring when an image is recorded by ejecting an aqueous fluorescent ink through use of an ink jet recording apparatus provided with a recovery mechanism that recovers the ejection state of an ink by applying a pressure to an ink flow path inside a recording head. That is, the present invention is directed to provide an ink jet recording method that suppresses non-ejection and is excellent in ejection recoverability even in such case. The present invention is also directed to provide an ink jet recording apparatus to be used in the above-mentioned ink jet recording method.

That is, according to one aspect of the present invention, there is provided an ink jet recording method including recording an image on a recording medium through use of an ink jet recording apparatus, the inkjet recording apparatus including: an aqueous ink; a recording head including an ink flow path in which the aqueous ink flows and including an ejection orifice configured to eject the aqueous ink; and a recovery mechanism configured to recover an ejection state of the aqueous ink from the ejection orifice by applying a pressure to the ink flow path inside the recording head, wherein the aqueous ink contains resin particles each dyed with a basic dye exhibiting fluorescence and a water-soluble resin, wherein the resin particles are each formed of a resin having an anionic group-containing unit, and wherein the water-soluble resin has an anionic group-containing unit.

Further features of the present invention will become apparent from the following description of exemplary embodiments with reference to the attached drawings.

DESCRIPTION OF THE EMBODIMENTS

Figure 1:
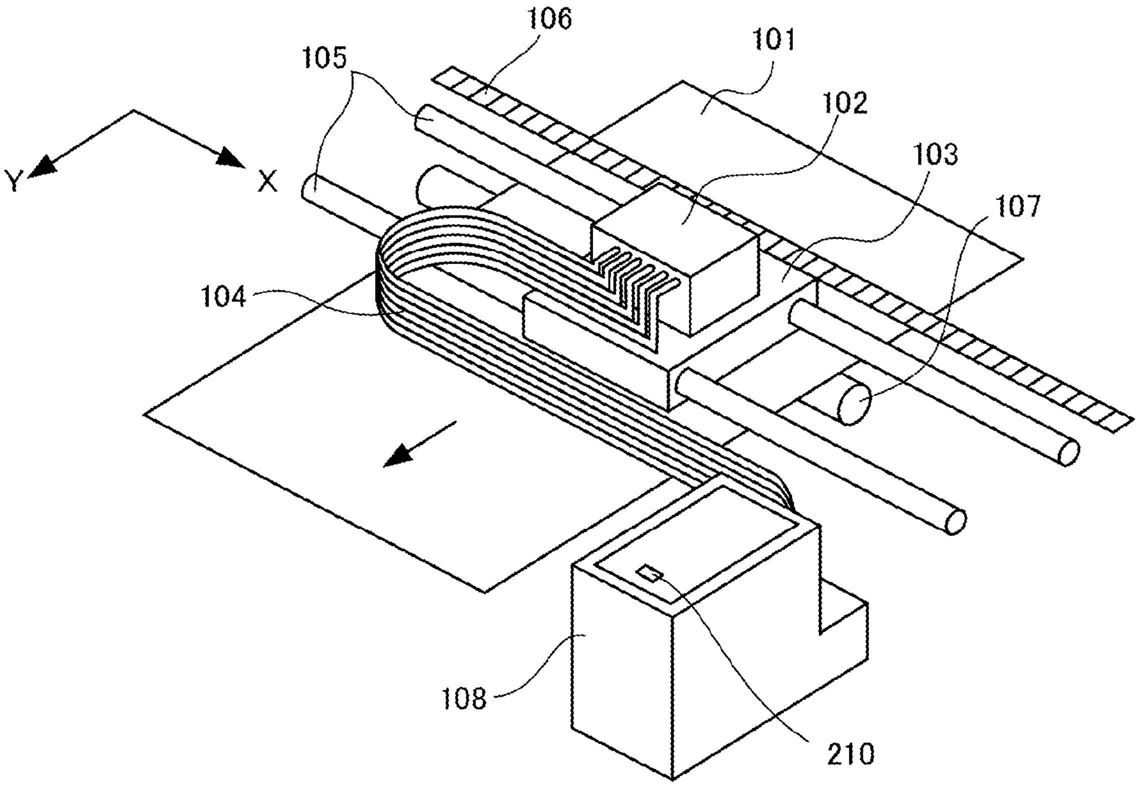
FIG. 1 is a perspective view for schematically illustrating an embodiment of an ink jet recording apparatus of the present invention.

The inventors of the present invention have made investigations on recording an image by ejecting a fluorescent ink containing a fluorescent dye through use of a recording apparatus provided with a pressure recovery system. As a result, it has been found that non-ejection of an ink is liable to occur, and an image to be recorded is liable to be distorted. Accordingly, the inventors have made extensive investigations on an ink jet recording method that suppresses non-ejection and is excellent in ejection recoverability even when an image is recorded by ejecting an aqueous fluorescent ink through use of an ink jet recording apparatus provided with a recovery mechanism that recovers the ejection state of an ink by applying a pressure to an ink flow path inside a recording head, and an ink jet recording apparatus to be used in the above-mentioned ink jet recording method. Thus, the inventors have reached the present invention.

The present invention is described in more detail below by way of exemplary embodiments. In the present invention, when a compound is a salt, the salt is present as dissociated ions in an ink, but the expression "contain a salt" is used for convenience. In addition, an aqueous ink for ink jet is sometimes referred to simply as "ink". Physical property values are values at normal temperature (25° C.), unless otherwise stated. In the present invention, the "unit" for forming a resin means a repeating unit derived from a single monomer.

The inventors have first investigated a fluorescent ink with which an image excellent in color development can be recorded. As a result, it has been found that, when an ink in which the content of a fluorescent dye is merely increased is used, the lightness of an image to be recorded is significantly decreased while the chroma thereof is improved. It is conceived that the foregoing is caused by concentration quenching peculiar to a fluorescent material. As a result of a further investigation, it has been found that, when resin particles each dyed with a fluorescent dye are used, the decrease in lightness can be suppressed, and an image exhibiting desired color developability can be recorded.

Then, the inventors have made investigations on recording an image by ejecting a fluorescent ink from an ink jet recording apparatus provided with a recovery mechanism (pressure recovery mechanism) that recovers the ejection state of an ink by applying a pressure to an ink flow path inside a recording head. As a result, it has been found that non-ejection of an ink is liable to occur after execution of the recovery operation by the pressure recovery mechanism, and an image to be obtained may be distorted. In the case in which a conventional dye ink or pigment ink, which is not a fluorescent ink, is used, even when the above-mentioned ink jet recording apparatus provided with a pressure recovery mechanism is used, non-ejection of an ink did not occur or was minimum to such a degree as not to be a problem.

The inventors have inferred the cause for easy occurrence of non-ejection of an ink when a fluorescent ink is ejected from the ink jet recording apparatus provided with a pressure recovery mechanism as described below. When the recovery operation is performed by the pressure recovery mechanism, an ink flows vigorously to involve a gas, such as air, which is present inside an ink flow path, with the result that bubbles are generated inside the ink flow path. It is conceived that, when the generated bubbles join the flow of the ink during recording to reach the recording head, the ink is not easily ejected from an ejection orifice, with the result that non-ejection of the ink is liable to occur. In contrast, it is conceived that, when a conventional dye ink or pigment ink is used, bubbles are broken in the middle of the flow of the ink and it becomes difficult for the bubbles to reach the ejection orifice, with the result that non-ejection of the ink is less liable to occur.

Meanwhile, when an ink containing, as a coloring material, resin particles each dyed with a basic dye exhibiting fluorescence is used, bubbles are not easily broken and easily reach the ejection orifice. The basic dye has a basic group that is a cationic moiety and an anionic moiety, such as a chloride ion, serving as a counter ion of the cationic moiety. When the resin particles are each dyed with such basic dye, the anionic moiety of each of the resin particles and the cationic moiety of the basic dye interact with each other. It is conceived that most of the basic dye is present in the ink in a state of interacting with the resin particles, but part of the basic dye is present in the ink in a state of being separated from the resin particles. It is conceived that, when the basic dye separated from the resin particles is present in the ink, the cation concentration is locally increased. When the cation concentration is increased, the resin particles having anionic groups are easily aggregated with each other to shorten the distances between the resin particles. The anionic groups of the resin particles act in the ink in a hydrophilic manner, and moieties other than the anionic groups act in a hydrophobic manner. As a result, it is conceived that the hydrophilic moieties of the resin particles interact with each other, and the hydrophobic moieties of the resin particles interact with each other, with the result that the resin particles exhibit behavior as in a surfactant.

When the pressure recovery operation is performed under a state in which the cation concentration is increased, the resin particles exhibit behavior as in the surfactant in the ink that flows vigorously, and bubbles are generated. It is conceived that the resin particles strongly interact with each other on the periphery of the generated bubbles, and the bubbles are in a state of not being easily broken. It is conceived that the bubbles in a state of not being easily broken join the flow of the ink and move in the ink flow path in the recording head to reach the ejection orifice, and the ejection property of the ink is decreased to distort the image.

Under such recognition, the inventors have made further investigations. As a result, it has been found that non-ejection after the pressure recovery operation is suppressed through use of an ink further containing a water-soluble resin having an anionic group-containing unit. When the cationic moiety of the basic dye separated from the resin particles and the anionic group of the water-soluble resin interact with each other, the local increase in cation concentration in the ink is suppressed. Even when bubbles are generated by the pressure recovery operation, as long as the local increase in cation concentration is suppressed, the interaction between the resin particles is weakened. Thus, the strength of the bubbles is decreased, and the bubbles are easily broken. As a result, it is conceived that the bubbles having passed through the ink flow path inside the recording head are broken before reaching the ejection orifice, and non-ejection of the ink is suppressed.

It is conceived that, in the ink containing no water-soluble resin having an anionic group-containing unit, the cation component is locally increased. During the actual recording operation, the concentration of the resin particles in the ink is increased along with the evaporation of moisture from the distal end of the ejection orifice, and the cation concentration is increased. When the concentration of the resin particles in the ink is increased, the resin particles interact with each other to be easily aggregated. As a result, the ink viscosity is increased in the vicinity of the distal end of the ejection orifice, and the ejection property of the ink is decreased. When the ejection interval becomes longer along with a decrease in ejection property of the ink, the ink may not be easily ejected normally even by the ejection operation. In order to suppress such decrease in ejection property of the ink, it is required to increase the number of ejection operations for refreshing the state in the vicinity of the ejection orifice of the ink flow path by discharging the ink to a region other than the recording medium (e.g., a discharge port).

Meanwhile, in the ink containing a water-soluble resin having an anionic group-containing unit, the resin particles and the water-soluble resin interact with each other. As a result, the interaction between the resin particles is suppressed, and the aggregation of the resin particles at the distal end of the ejection orifice is suppressed. With this configuration, even when the ejection interval becomes longer, the ink can be normally ejected by the normal ejection operation. Thus, the number of ejection operations for refreshing the state in the vicinity of the ejection orifice of the ink flow path can be reduced, and the amount of a waste ink can be reduced.

Ink Jet Recording Method and Ink Jet Recording Apparatus

In an ink jet recording method of the present invention, an inkjet recording apparatus including an aqueous ink, a recording head including an ejection orifice configured to eject the aqueous ink, and a recovery mechanism configured to recover an ejection state of the aqueous ink from the ejection orifice is used. The recording head includes an ink flow path in which the aqueous ink flows. The recovery mechanism is a mechanism that recovers the ejection state of the aqueous ink from the ejection orifice by applying a pressure to the ink flow path inside the recording head. The ink jet recording method of the present invention includes a step of recording an image on a recording medium through use of the ink jet recording apparatus (hereinafter sometimes referred to as "recording step"). The aqueous ink contains resin particles each dyed with a basic dye exhibiting fluorescence and a water-soluble resin. Further, the resin particles are each formed of a resin having an anionic group-containing unit, and the water-soluble resin has an anionic group-containing unit.

In addition, the ink jet recording apparatus of the present invention is an apparatus to be suitably used in the above-mentioned ink jet recording method, and includes an aqueous ink, a recording head, and a recovery mechanism. The aqueous ink contains resin particles each dyed with a basic dye exhibiting fluorescence and a water-soluble resin. Further, the resin particles are each formed of a resin having an anionic group-containing unit, and the water-soluble resin has an anionic group-containing unit.

FIG. 1 is a perspective view for schematically illustrating an embodiment of the ink jet recording apparatus of the present invention. The ink jet recording apparatus of this embodiment is an ink jet recording apparatus of a so-called serial system for performing a recording operation by reciprocally scanning its recording head in an X direction (main scanning direction). A recording medium 101 is intermittently conveyed by a conveying roller 107 to a Y direction (sub-scanning direction). A recording unit 102 mounted on a carriage 103 is reciprocally scanned in the X direction (main scanning direction) that is a direction perpendicular to the Y direction that is the conveying direction of the recording medium 101. The recording operation is performed by the conveyance of the recording medium 101 in the Y direction and the reciprocal scanning of the recording unit 102 in the X direction. The recording unit 102 includes a recording head 203 (FIG. 2) of an ink jet system for ejecting, from a plurality of ejection orifices, an ink to be supplied and a sub-tank 202 (FIG. 2) serving as a second ink storage portion, and the unit is mounted on the carriage 103. The carriage 103 is movably supported along guide rails 105 arranged along the X direction, and is fixed to an endless belt 106 moving in parallel to the guide rails 105. The endless belt 106 is reciprocated by the driving force of a motor to reciprocally scan the carriage 103 in the X direction.

Figure 2:
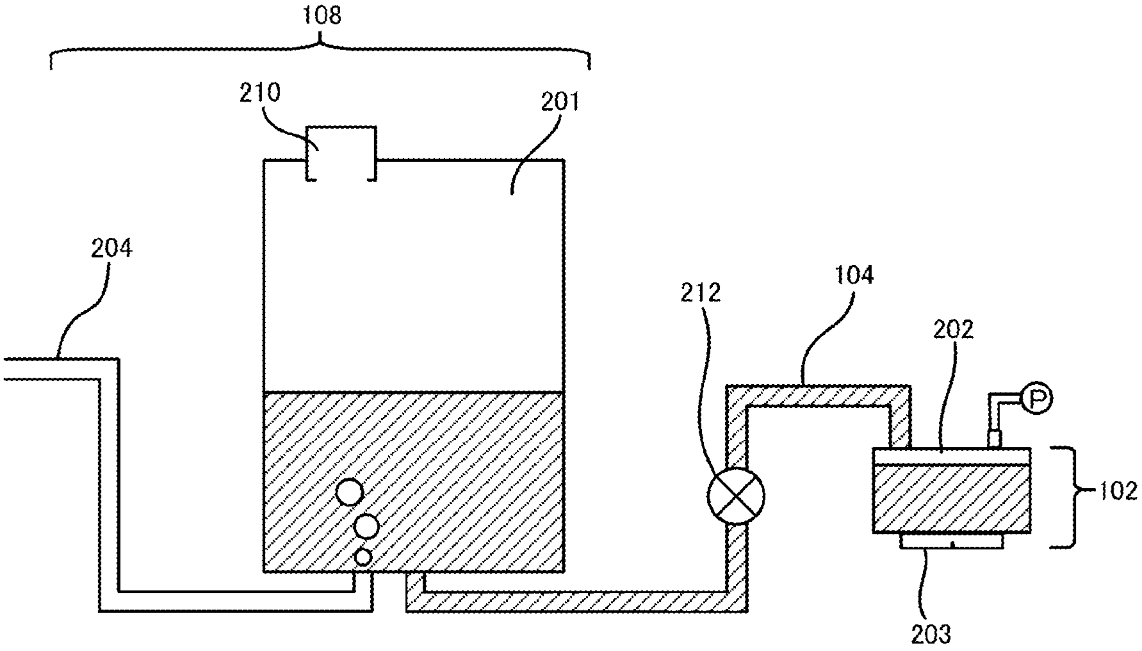
FIG. 2 is a schematic view for schematically illustrating an example of an ink supply system.

A main tank 201 (FIG. 2) serving as a first ink storage portion is stored in a main tank storage portion 108. The main tank 201 stored in the main tank storage portion 108, and the sub-tank 202 of the recording unit 102 are connected to each other through an ink supply tube 104. The ink is supplied from the main tank 201 to the sub-tank 202 (FIG. 2) through the ink supply tube 104 and is then ejected from the ejection orifices of the recording head 203 (FIG. 2). The main tank 201, the ink supply tube 104, and the sub-tank 202 may each be arranged in a number corresponding to the kinds of the ink. The main tank 201 and the sub-tank 202 are preferably connected to each other through the ink supply tube 104 without intermediation of any other ink storage portions.

The main tank storage portion 108 includes an ink injection port 210 for injecting an ink into the main tank 201 from outside of the ink jet recording apparatus. An ink is injected from an ink bottle into the main tank in a state of being mounted inside the ink jet recording apparatus, for example, when the ink jet recording apparatus is used for the first time or when the amount of an ink is decreased. A user can inject an ink into the main tank 201 by opening the ink injection port 210. That is, the main tank is left inside the ink jet recording apparatus, and is not replaced in itself.

FIG. 2 is a schematic view for schematically illustrating an example of an ink supply system. The ink (indicated by hatching) stored in the main tank 201 is supplied to the sub-tank 202 through the ink supply tube 104, and then is supplied to the recording head 203. A gas introduction tube 204 serving as an air communication portion is connected to the main tank 201. When recording is performed to consume the ink, the ink is supplied from the main tank 201 to the sub-tank 202 and hence the amount of the ink in the main tank 201 reduces. In that case, air is introduced from the gas introduction tube 204 one end of which is opened to the air into the main tank 201 to keep an internal negative pressure for holding the ink in the ink supply system substantially constant.

The recording unit 102 includes the recording head 203 and the sub-tank 202. The following form may be adopted: the sub-tank 202 is mounted on the recording unit 102, which is a head cartridge having incorporated thereinto the recording head 203, and the recording unit 102 having mounted thereon the sub-tank 202 is mounted on the carriage 103. Further, a form in which the recording unit 102 integrally formed by the sub-tank 202 and the recording head 203 is mounted on the carriage 103 may be adopted. Of those, as illustrated in FIG. 1 and FIG. 2, the form in which the recording unit 102 having mounted thereon the sub-tank 202 is set on the carriage 103 is preferably adopted.

Examples of the ink ejection system of the recording head 203 may include a system including applying mechanical energy to the ink and a system including applying thermal energy to the ink. Of those, the system including applying the thermal energy to the ink to eject the ink is preferably adopted.

The ink jet recording apparatus according to this embodiment includes the recording unit 102 that includes the sub-tank 202 serving as the second ink storage portion and the recording head 203 as illustrated in FIG. 2. Inside the sub-tank 202 and the recording head 203 forming the recording unit 102, there is formed an ink flow path, which communicates from an upstream end of the sub-tank 202 to a downstream end that is the ejection orifice of the recording head 203, and which is supplied with an ink.

The ink jet recording apparatus includes a recovery mechanism (pressure recovery mechanism) that recovers the ejection state of the ink from the ejection orifice by applying a pressure to the ink flow path inside the recording head. The pressure recovery mechanism may be any mechanism capable of applying a pressure to the ink flow path inside the recording head. For example, mechanisms as described in Japanese Patent Application Laid-Open No. 2000-238294, Japanese Patent Application Laid-Open No. 2000-238277, Japanese Patent Application Laid-Open No. 2000-033711, and the like may be adopted.

Figure 3:
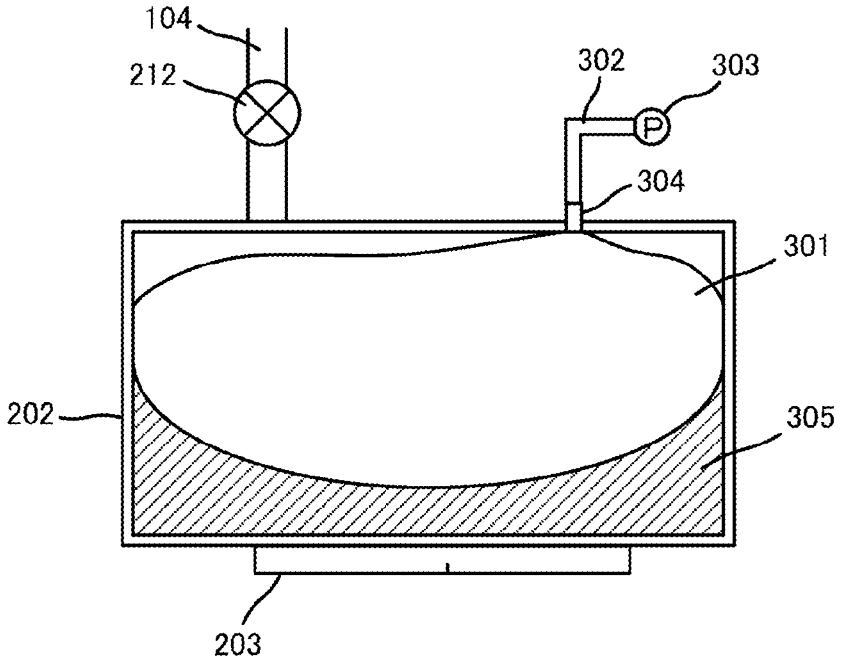
FIG. 3 is a schematic view for schematically illustrating an example of a pressure recovery mechanism.
Figure 4:
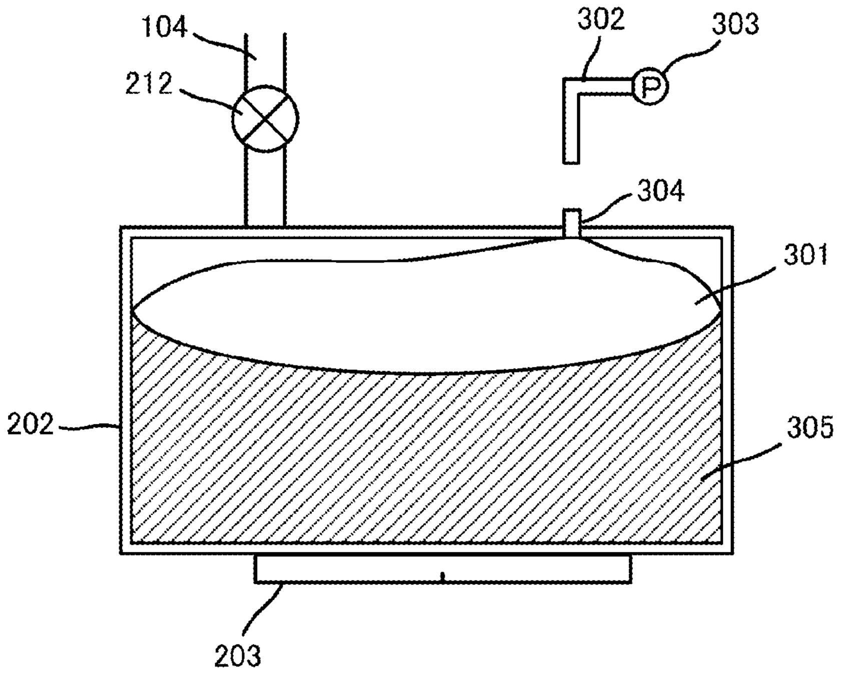
FIG. 4 is a schematic view for schematically illustrating the example of the pressure recovery mechanism.

FIG. 3 and FIG. 4 are each a schematic view for schematically illustrating an example of the pressure recovery mechanism. In order to perform the recovery operation for recovering the ejection state of the ink from the ejection orifice of the recording head 203 mounted on the carriage 103 (FIG. 1), a pump 303 is first coupled to a vent hole 304 formed in the sub-tank 202 through an air tube 32 as illustrated in FIG. 3. A sack-shaped bag 301 having flexibility, which is accommodated in the sub-tank, is coupled to the vent hole 304. Then, air in a predetermined volume is injected under pressure into the bag 301 by operating the pump 303, and the bag 301 is inflated inside the sub-tank 202. The pressure inside the ink flow path of the recording head 203 is increased along with the inflation of the bag 301 to cause a flow of an ink 305 to the ejection orifice of the recording head 203, and the ink is discharged from the ejection orifice. Thus, the ejection state of the ink 305 from the ejection orifice can be recovered.

The pressure to be applied to the ink flow path during the recovery operation is set to preferably 20 kPa or more, more preferably 30 kPa, even more preferably 40 kPa or more. When the recovery operation is performed by applying a pressure of 20 kPa or more to the ink flow path, the ejection recoverability of the ink can be further improved. The pressure to be applied to the ink flow path during the recovery operation is set to preferably 80 kPa or less.

After the execution of the recovery operation, the air tube 302 is removed from the vent hole 304 as illustrated in FIG. 4. As a result, the air injected into the bag 301 flows out from the vent hole, and the internal pressure of the bag 301 is returned to the atmospheric pressure. Thus, the bag 301 can be deformed by contraction inside the sub-tank 202.

In the ink jet recording method of the present invention, the ink jet recording apparatus that is excellent in ejection stability of an ink in spite of the compact size thereof is used, and hence an image can be recorded at high productivity. The moving speed of the recording head during recording of an image may be set to preferably 30 inches/sec or more, more preferably 35 inches/sec or more. The moving speed of the recording head during recording of an image is set to preferably 70 inches/sec or less.

Any medium may be used as the recording medium on which the image is to be recorded by the ink jet recording method of the present invention. Of such media, such sheets of paper each having permeability as described below are preferably used: a recording medium free of any coating layer, such as plain paper or uncoated paper; and a recording medium including a coating layer, such as glossy paper or art paper.

(Ink)

In the ink jet recording method of the present invention, an aqueous ink for ink jet containing resin particles each dyed with a fluorescent dye and a water-soluble resin is used. Each component for forming an ink to be used in the ink jet recording method of the present invention and the like are described in detail below.

[Resin Particles Each Dyed with Fluorescent Dye]

The ink contains resin particles (fluorescent particles) each dyed with a fluorescent dye. The fluorescent dye is a basic dye exhibiting fluorescence. The term "fluorescent dye" as used herein refers to a dye that emits fluorescence by excitation light beams in an ultraviolet or visible region. Whether or not a dye corresponds to the "fluorescent dye" that exhibits fluorescence can be determined in accordance with, for example, the method described below. A sample obtained by dissolving a dye in a liquid that can dissolve the dye is irradiated with ultraviolet rays (ultraviolet light) having a long wavelength (from about 315 nm to about 400 nm) to a slightly visible degree by a black light or the like. When light having a color different from that of the ultraviolet light radiated from the black light can be visually observed, the dye can be determined to be the "fluorescent dye" that exhibits fluorescence. A commercially available product (e.g., product name "SLUV-4" (manufactured by AS ONE Corporation)) may be used as the black light. In addition, fluorescence may be measured also through use of a spectrofluorometer or the like. As the spectrofluorometer, for example, product name "FP-8050 series" manufactured by JASCO Corporation may be used.

The fluorescent dye in the resin particles each dyed with the fluorescent dye may be analyzed in accordance with, for example, the procedure described below. Resin particles taken out from an ink in accordance with an ordinary method are dissolved in an organic solvent, such as chloroform, to prepare a sample. A fluorescent dye is isolated from the prepared sample through use of a high-performance liquid chromatograph (HPLC). The isolated dye is analyzed by a general structure analysis method, such as nuclear magnetic resonance (NMR) spectroscopy or matrix-assisted laser desorption/ionization mass spectrometry (MALDI-MS).

The basic dye is a compound exhibiting fluorescence, which has an amino group or an imino group (that may form a salt) that is a basic group in a molecular structure thereof. Examples of the compound having an amino group or an imino group in the molecular structure thereof may include "dyes each including 'basic' in the name shown in the Colour Index International". The Colour Index International is a database of coloring materials constructed by the Society of Dyers and Colourists (SDC) and others. Examples of the skeleton of the dye may include xanthene, azine, azole, thiazole, azo, diaryl methane, triaryl methane, acridine, coumarin, and methine skeletons. Of those, compounds having, for example, xanthene and coumarin skeletons are preferred, and a compound having a xanthene skeleton is more preferred.

When specific examples of the basic dye exhibiting fluorescence are each represented by a C.I. number or a general name, examples thereof may include: C.I. Basic Red 1, 1:1, 2, 4, 8, 11, 12, and 13; C.I. Basic Violet 1, 3, 10, 11, 11:1, and 14; rhodamine 19 and 575; C.I. Basic Yellow 1, 2, 9, 13, 24, 37, 40, and 96; C.I. Basic Blue 7; C.I. Basic Green 1; and C.I. Fluorescent Brightener 363. Of those, for example: C.I. Basic Red 1 and 1:1; C.I. Basic Violet 11 and 11:1; and C.I. Basic Yellow 40 are preferred because the dyes each have excellent color developability.

It is preferred that the fluorescent dye include two or more kinds of fluorescent dyes. When a plurality of fluorescent dyes are present in the resin particles, the crystallization of each of the fluorescent dyes is inhibited, and hence the fluorescent dyes interact with the resin particles efficiently at a molecular level, thereby being capable of achieving a stably dyed state.

The content (% by mass) of the fluorescent dye in the ink is preferably 0.1% by mass or more and 5.0% by mass or less with respect to the total mass of the ink. The ratio (% by mass) of the fluorescent dye in the resin particles is preferably 1.0% by mass or more and 15.0% by mass or less, more preferably 3.0% by mass or more and 8.0% by mass or less. When the ratio of the fluorescent dye in the resin particles is too small, the color developability (chroma) of an image may be slightly decreased. Meanwhile, when the ratio of the fluorescent dye in the resin particles is too large, the color developability (lightness) of an image may be slightly decreased due to concentration quenching. Other coloring materials, such as a dye and a pigment, may each be used in addition to the resin particles each dyed with a basic dye exhibiting fluorescence.

[Resin Particles]

The term "resin particles" as used herein means a resin that is dispersed in an aqueous medium and may be present in the aqueous medium in a state having a particle diameter. Thus, the resin particles are present in a state of being dispersed in the ink, that is, in a state of a resin emulsion.

Whether or not a resin corresponds to the "resin particles" can be determined in accordance with the method described below. First, a liquid (resin solid content: 10% by mass) containing a resin neutralized with an alkali (sodium hydroxide, potassium hydroxide, etc.) equivalent to an acid value is prepared. Next, the prepared liquid is diluted 10-fold (based on a volume) with pure water to prepare a sample solution. Then, when the particle diameter of the resin in the sample solution is measured by a dynamic light scattering method, and particles each having a particle diameter are measured, the resin can be determined to be the "resin particles". As a particle size distribution-measuring apparatus using the dynamic light scattering method, a particle size analyzer (e.g., product name "UPA-EX 150", manufactured by Nikkiso Co., Ltd.) or the like may be used. The measurement conditions in this case may be set to, for example, SetZero: 30 seconds, number of measurements: 3, measurement time: 180 seconds, shape: spherical shape, and refractive index: 1.59. Needless to say, the particle size distribution-measuring apparatus, the measurement conditions, and the like to be used are not limited to the foregoing. The purpose of measuring the particle diameter through use of the neutralized resin is to recognize that particles are formed even when the resin is sufficiently neutralized to make it more difficult to form particles. The resin having a shape of a particle even under such conditions is present in a state of a particle even in an aqueous ink.

The resin particles are each formed of a resin having an anionic group-containing unit. Examples of the resin for forming the resin particles include an acrylic resin and a polyester resin. The polyester resin is preferably a polyester resin having a sulfonic acid group, for example. The acrylic resin is preferably an acrylic resin having a carboxylic acid group, for example. Of those, the acrylic resin is preferred as the resin for forming the resin particles.

As the resin particles, resin particles each having a so-called core-shell structure including a core portion and a shell portion covering the core portion are preferably used. The core portion preferably has an aromatic group-containing unit and a cyano group-containing unit. When the core portion has an aromatic group-containing unit and a cyano group-containing unit, the resin particle is efficiently dyed with the fluorescent dye, and the color developability inherent in the fluorescent dye is efficiently exhibited. Thus, the color developability of an image can be improved. The shell portion preferably has an aromatic group-containing unit and an anionic group-containing unit.

As a monomer that forms an aromatic group-containing unit through polymerization, a monomer having one polymerizable functional group, such as an ethylenically unsaturated bond, in the molecule is preferred. Specific examples thereof may include styrene, vinyltoluene, p-fluorostyrene, p-chlorostyrene, α-methylstyrene, 2-vinylnaphthal ene, 9-vinylanthracene, 9-vinyl carbazol e, phenyl (meth)acrylate, benzyl (meth)acrylate, 2-phenoxyethyl (meth)acrylate, 2,4-diamino-6-((meth)acryloyloxy)ethyl-1,3,5-tri azine, 2-naphthyl (meth)acrylate, 9-anthryl (meth)acrylate, and (1-pyrenyl)methyl (meth)acrylate. As the monomer that forms an aromatic group-containing unit through polymerization, a monomer not having an anionic group or a cyano group and a monomer having a molecular weight of 300 or less are preferred, and a monomer having a molecular weight of 200 or less is more preferred. Of those, styrene and derivatives thereof are still more preferred from the viewpoints of satisfactory reactivity during polymerization and excellent stability of resin particles to be obtained, and styrene and vinyl toluene are particularly preferred.

As a monomer that forms a cyano group-containing unit through polymerization, a monomer having one polymerizable functional group, such as an ethylenically unsaturated bond, in the molecule is preferred. Specific examples thereof may include acrylonitrile, methacrylonitrile, chloroacrylonitrile, and 2-cyanoethyl (meth)acrylate. As the monomer that forms a cyano group-containing unit through polymerization, a monomer not having an anionic group or an aromatic group and a monomer having a molecular weight of 300 or less are preferred, and a monomer having a molecular weight of 200 or less is more preferred. Of those, acrylonitrile and methacrylonitrile are particularly preferred from the viewpoints of satisfactory reactivity during polymerization and excellent stability of resin particles to be obtained.

As an anionic group in the anionic group-containing unit, an anionic group having one polymerizable functional group, such as an ethylenically unsaturated bond, in the molecule is preferred. Specific examples thereof may include a carboxylic acid group, a phenolic hydroxy group, and a phosphoric acid ester group. Of those, a carboxylic acid group is preferred because the stability of the resin particles in the ink is satisfactory. As a monomer that forms an anionic group-containing unit through polymerization, there may be given, for example, (meth)acrylic acid, p-vinylbenzoic acid, 4-vinylphenol, (3-carboxyethyl (meth) acrylate, a phosphoric acid (2-hydroxyethyl methacrylate) ester, 2-hydroxyethyl (meth)acrylate, and 3-hydroxypropyl (meth)acrylate. As the monomer that forms an anionic group-containing unit through polymerization, a monomer not having an aromatic group or a cyano group and a monomer having a molecular weight of 300 or less are preferred, and a monomer having a molecular weight of 200 or less is more preferred. Of those, (meth)acrylic acid is particularly preferred. In addition, the anionic group in the anionic group-containing unit is preferably a carboxylic acid group alone. The anionic group may be in any of an acid form and a salt form. When the anionic group is in a salt form, the anionic group may be in any of a partially dissociated state or an entirely dissociated state. When the anionic group is in a salt form, as a cation serving as a counter ion, there may be given an alkali metal cation, ammonium, organic ammonium, and the like.

The shell portion preferably has a unit derived from a cross-linking agent. As a cross-linking agent for forming the unit derived from a cross-linking agent, at least one kind may be used, and two or more kinds of cross-linking agents are preferably used. As the cross-linking agent, a compound having two ethylenically unsaturated bonds in the molecule is preferred. When the compound having two ethylenically unsaturated bonds in the molecule is used as the cross-linking agent, the aggregation of resin particles caused by excess cross-linking is suppressed, and resin particles having more uniform particle diameters can be obtained. Of the compounds each having two ethylenically unsaturated bonds in the molecule, divinylbenzene and ethylene glycol di(meth)acrylate are more preferred.

A surfactant may be used when resin particles are produced. It is preferred that resin particles be produced in the presence of a surfactant because the particle diameter and shape of each of resin particles to be obtained easily become stable. However, a non-reactive surfactant may easily peel off from the resin particles. When the surfactant peels off in the ink, the physical properties of the ink may be influenced, and the ejection stability and the like are liable to be decreased. Accordingly, as the surfactant to be used when resin particles are produced, a reactive surfactant is preferred.

As the reactive surfactant, a compound in which a polymerizable functional group, such as a (meth)acryloyl group, a maleyl group, a vinyl group, or an allyl group, is bonded to an inner portion or an end of a molecule formed of a hydrophilic portion and a hydrophobic portion is preferably used. An example of the hydrophilic portion may be a polyoxyalkylene chain, such as an ethylene oxide chain or a propylene oxide chain. In addition, an example of the hydrophobic portion may be a structure, such as an alkyl, an aryl, or a combination thereof. The hydrophilic portion and the hydrophobic portion may be bonded to each other via a linking group such as an ether group. As the reactive surfactant, a reactive surfactant having a molecular weight of more than 200 is preferred, a reactive surfactant having a molecular weight of more than 300 is more preferred, and a reactive surfactant having a molecular weight of 400 or more is particularly preferred.

The core portion and the shell portion of the resin particle may each have a unit other than those described above as long as the effect of the present invention is not impaired. As the unit other than those described above, a unit having one polymerizable functional group in the molecule is preferred, and a specific example thereof may be a unit derived from an ethylenically unsaturated monomer.

The volume-based cumulative 50% particle diameter (D50) of the resin particles is preferably 250 nm or less. When the volume-based cumulative 50% particle diameter (D50) of the resin particles is more than 250 nm, the resin particles are liable to be sedimented inside the ink cartridge, the ink supply system, the recording head, and the like, and deviation from the desired color tone is liable to occur. The volume-based cumulative 50% particle diameter (D50) of the resin particles is preferably 50 nm or more. The volume-based cumulative 50% particle diameter (D50) of the resin particles may be measured by the same method as the method of determining whether or not a resin corresponds to resin particles described above.

The content (% by mass) of the resin particles in the ink is preferably 1.0% by mass or more and 10.0% by mass or less with respect to the total mass of the ink. When the content of the resin particles is less than 1.0% by mass, the color developability of an image may be slightly decreased. Meanwhile, when the content of the resin particles is more than 10.0% by mass, the ejection stability of the ink may be slightly decreased.

[Production Method for Dyed Resin Particles]

Resin particles may be produced in accordance with a conventionally known method, such as an emulsion polymerization method, a mini-emulsion polymerization method, a seed polymerization method, or a phase-change emulsification method. As a method of dyeing resin particles, there may be given, for example, a method involving polymerizing a monomer mixed liquid having a fluorescent dye dissolved therein to form resin particles, and a method involving adding a fluorescent dye to resin particles, followed by heating. Of those, the method involving adding a fluorescent dye to resin particles, followed by heating, is preferred because the method can be applied to a wider variety of fluorescent dyes. It is preferred that no dyeing aid (a water-soluble resin, a surfactant, etc.) be added during heating. When a water-soluble resin is used as the dyeing aid, the water-soluble resin may form a film to inhibit the redispersion of resin particles, which may slightly decrease the sticking recoverability of the ink. In addition, when a surfactant is used as the dyeing aid, the physical properties of the ink may be influenced, and the ejection stability of the ink may be slightly decreased.

[Method of verifying Resin Particles]

The configuration of resin particles may be verified in accordance with the method described in the following sections (i) to (iii). A method of analyzing and verifying resin particles by extracting the resin particles from an ink is described below, but the resin particles extracted from an aqueous dispersion liquid or the like may also analyzed and verified in the same manner.

(i) Extraction of Resin Particles

Resin particles may be separated and extracted from an ink containing the resin particles by a density gradient centrifugation method. The resin particles are separated and extracted based on a difference in sedimentation coefficient of components in a density gradient sedimentation velocity method out of the density gradient centrifugation methods. In addition, the resin particles are separated and extracted based on a difference in density of components in a density gradient sedimentation equilibrium method out of the density gradient centrifugation methods.

(ii) Recognition and Separation of Layer Structure

First, the resin particles are each dyed and immobilized with ruthenium tetroxide, and then embedded in an epoxy resin to be stably held. Then, the resin particle embedded in the epoxy resin is cut with an ultramicrotome, and a cross-section is observed with a scanning transmission electron microscope (STEM). The layer structure of the resin particle can be recognized by observing the cross-section cut along the gravity center of the resin particle. The resin particle embedded in the epoxy resin is used as an analysis sample, and elements contained in a layer (a core portion or a shell portion) forming the resin particle can be quantitatively analyzed by STEM-EDX in which energy dispersive X-ray spectroscopy (EDX) is also provided.

(iii) Analysis of Unit (Monomer) for Forming Resin in Each Layer

The resin particles to be used as a sample for separating a resin in each layer may be in a state of a dispersion liquid. In addition, resin particles in a state of being dried and formed into a film may also be used as a sample. Resin particles to be used as a sample are dissolved in an organic solvent. After that, each layer is separated by gel permeation chromatography (GPC), and the resin for forming each layer is fractionated. Then, the fractionated resin is subjected to elemental analysis by a combustion method. Separately from the foregoing, the fractionated resin is subjected to pretreatment by an acid decomposition (hydrofluoric acid addition) method or an alkali fusion method, and then an inorganic component is quantitatively analyzed by inductively coupled plasma emission spectroscopy. The layer of the resin particles formed of the fractionated resin can be known by comparison of the results of the elemental analysis and the quantitative analysis of the inorganic component to the results of the quantitative analysis of the elements by STEM-EDX obtained in the section (ii).

In addition, the fractionated resin is analyzed by nuclear magnetic resonance (NMR) spectroscopy and matrix-assisted laser desorption/ionization mass spectrometry (MALDI-MS). Thus, the kinds and ratios of the unit (monomer) and the cross-linking component for forming the resin can be known. Further, the monomer generated by depolymerization can also be directly detected by analyzing the fractionated resin by pyrolysis gas chromatography.

(Water-Soluble Resin)

The water-soluble resin has an anionic group-containing unit. The water-soluble resin is preferably an acrylic resin or a urethane resin, more preferably an acrylic resin. An anionic group in the anionic group-containing unit interacts with a cationic moiety of the basic dye separated from the resin particles to suppress or relax the local assembly of the cationic moieties. As a result, as described above, the interaction between the resin particles becomes weak, and bubbles generated during the pressure recovery operation are easily broken.

As the anionic group-containing unit in the water-soluble acrylic resin, the above-mentioned anionic group-containing unit may be used. The water-soluble acrylic resin may further have a unit (other unit) other than the anionic group-containing unit. As a monomer for forming the other unit, there may be given, for example: the above-mentioned monomer that forms an aromatic group-containing unit through polymerization; when monomers each having a substituent, such as an alkoxy group or a hydroxy group, are also included, 2-hydroxyethyl (meth)acrylate, 3-hydroxypropyl (meth)acrylate, and methoxy (mono, di, tri, poly) ethylene glycol (meth)acrylate; alkenes, such as ethylene and propylene; alkyl (meth)acrylates, such as methyl (meth) acrylate, ethyl (meth)acrylate, butyl (meth)acrylate, lauryl (meth)acrylate, and hexadecyl (meth)acrylate; monocyclic (meth)acrylates, such as cyclopropyl (meth)acrylate, cyclohexyl (meth)acrylate, cyclooctyl (meth)acrylate, and cyclodecyl (meth)acrylate; bicyclic (meth)acrylates, such as isobornyl (meth)acrylate and norbornyl (meth)acrylate; and tricyclic (meth)acrylates, such as adamantyl (meth)acrylate, dicyclopentanyl (meth)acrylate, and dicyclopentenyloxyethyl (meth)acrylate. The water-soluble acrylic resin may be any of a random copolymer, a block copolymer, or a graft copolymer.

As the water-soluble urethane resin, a water-soluble urethane resin obtained by subjecting a polyisocyanate to a reaction with a component (a polyol having an acid group, a polyol having no acid group, a polyamine, etc.) that reacts with the polyisocyanate may be used. In addition, a water-soluble urethane resin obtained by further subjecting the above-mentioned components to a reaction with a chain extender or a cross-linking agent may also be used. A water-soluble urethane resin in which at least one of these components has an anionic group is used.

The acid value of the water-soluble resin is preferably 60 mgKOH/g or more and 250 mgKOH/g or less. When the acid value of the water-soluble resin is less than 60 mgKOH/g, the ejection stability of an ink may be decreased. Meanwhile, when the acid value of the water-soluble resin is more than 250 mgKOH/g, the aggregation of the resin particles on the recording medium is difficult to progress, and the color developability of an image may be decreased.

The weight-average molecular weight of the water-soluble resin is preferably 5,000 or more and 50,000 or less. When the weight-average molecular weight of the water-soluble resin is less than 5,000, the effect of improving the ejection stability of an ink may be slightly decreased. Meanwhile, when the weight-average molecular weight of the water-soluble resin is more than 50,000, the viscosity of an ink is liable to be increased, and the effect of improving the ejection stability of an ink may be slightly decreased.

The content (% by mass) of the water-soluble resin in the ink is preferably 0.1% by mass or more and 5.0% by mass or less with respect to the total mass of the ink. In addition, a mass ratio of the content (% by mass) of the water-soluble resin to the content (% by mass) of the resin particles is preferably 0.1 times or more, more preferably 0.5 times or more. When the mass ratio is 0.1 times or more, the interaction between the water-soluble resin and the resin particles is enhanced, and bubbles generated during the pressure recovery operation are more easily broken. Further, when the mass ratio is 0.5 times or more, that effect is further improved. Meanwhile, a mass ratio of the content (% by mass) of the water-soluble resin to the content (% by mass) of the resin particles is preferably 2.0 times or less, more preferably 1.0 times or less. When the mass ratio is more than 2.0 times, the viscosity of the ink may be increased to decrease the ejection stability.

The values of physical properties, such as the composition, weight-average molecular weight, and acid value, of the water-soluble resin may be measured in accordance with a conventionally known method. Specifically, the values of the physical properties of the water-soluble resin may be measured by analyzing a sediment and a supernatant liquid obtained by centrifuging the ink. The water-soluble resin may be analyzed even in a state of an ink, but it is preferred that the water-soluble resin extracted from the ink be analyzed because the measurement accuracy can be enhanced. Specifically, it is preferred to analyze a product obtained by adding an excess acid (hydrochloric acid, etc.) to a supernatant liquid obtained by centrifuging the ink at 75,000 rpm and drying a precipitated resin.

When the resin separated from the ink is analyzed through use of a high-temperature gas chromatography/mass spectrometer (high-temperature GC/MS), the kind and the like of the unit for forming the water-soluble resin can be recognized. In addition, when quantitative analysis is performed by a nuclear magnetic resonance ($^{13}C$-NMR) method or with a Fourier transform infrared spectrophotometer (FT-IR), the molecular weight, kind, and the like of a monomer for forming each unit can be recognized.

The acid value of the water-soluble resin may be measured by a titration method. Specifically, the water-soluble resin is dissolved in tetrahydrofuran (THF) to prepare a sample for measurement. Then, the acid value of the water-soluble resin may be measured on the prepared sample for measurement by potentiometric titration through use of a potentiometric automatic titration device and a potassium hydroxide ethanol titration solution. As the potentiometric automatic titration device, for example, product name "AT510" (manufactured by Kyoto Electronics Manufacturing Co., Ltd.) may be used.

The weight-average molecular weight of the water-soluble resin may be measured by gel permeation chromatography (GPC). The GPC measurement conditions may be set as described below.

Apparatus: Alliance GPC 2695 (manufactured by Waters)
Column: four continuous columns of Shodex KF-806M (manufactured by Showa Denko K. K.)
Mobile phase: THF (special grade)
Flow rate: 1.0 mL/min
Oven temperature: 40.0° C.
Injection amount of sample solution: 0.1 mL
Detector: refractive index (RI) detector
Polystyrene standard sample: PS-1 and PS-2 (manufactured by Polymer Laboratories, 17 kinds of samples having a molecular weight of 7,500,000, 2,560,000, 841,700, 377,400, 320,000, 210,500, 148,000, 96,000, 59,500, 50,400, 28,500, 20,650, 10,850, 5,460, 2,930, 1,300, and 580).

[Aqueous Medium]

The ink is an aqueous ink containing at least water as an aqueous medium. The ink may further contain a water-soluble organic solvent as the aqueous medium. As the water, deionized water or ion-exchanged water is preferably used. The content (% by mass) of the water in the ink is preferably 50.0% by mass or more and 95.0% by mass or less with respect to the total mass of the ink. In addition, as the water-soluble organic solvent, any water-soluble organic solvent generally used for an ink may be used. Examples thereof include alcohols, (poly)alkylene glycols, glycol ethers, nitrogen-containing compounds, and sulfur-containing compounds. The content (% by mass) of the water-soluble organic solvent in the ink is preferably 3.0% by mass or more and 50.0% by mass or less with respect to the total mass of the ink.

[Surfactant]

It is preferred that the ink further contain a surfactant. As the surfactant, any of anionic, cationic, and nonionic surfactants may be used. Of those, a nonionic surfactant is preferred. Examples of the nonionic surfactant may include various surfactants, such as hydrocarbon-based, fluorine-based, and silicone-based surfactants. The nonionic surfactant is preferably at least one of the hydrocarbon-based surfactant or the silicone-based surfactant. The surfactant acts in a direction to weaken the interaction between the resin particles to allow bubbles generated by the pressure recovery operation to be easily broken, with the result that the ejection stability of an ink can be improved. The content (% by mass) of the surfactant in the ink is preferably 0.1% by mass or more and 5.0% by mass or less, more preferably 0.2% by mass or more and 1.5% by mass or less with respect to the total mass of the ink.

Examples of the hydrocarbon-based nonionic surfactant may include a polyoxyethylene alkyl ether, an ethylene oxide adduct of acetylene glycol, a polyethylene glycol-polypropylene glycol block copolymer, and an ethylene oxide adduct of a polyhydric alcohol. An example of the fluorine-based nonionic surfactant may be a perfluoroalkyl ethylene oxide adduct. An example of the silicone-based nonionic surfactant may be a polyether-modified siloxane compound.

[Other Additives]

In addition to the above-mentioned components, as required, the ink may also contain water-soluble organic compounds that are solids at room temperature, for example, polyhydric alcohols, such as trimethylolpropane and trimethylolethane, urea and urea derivatives such as ethylene urea. Further, as required, the ink may contain various additives, such as any other surfactant, a pH adjuster, a rust preventive, a preservative, a fungicide, an antioxidant, a reduction inhibitor, an evaporation accelerator, a chelating agent, and any other resin.

According to one aspect of the present invention, there can be solved a problem occurring when an image is recorded by ejecting an aqueous fluorescent ink through use of an ink jet recording apparatus provided with a recovery mechanism that recovers the ejection state of an ink by applying a pressure to an ink flow path inside a recording head. That is, there can be provided an ink jet recording method that suppresses non-ejection and is excellent in ejection recoverability even in such case. In addition, according to another aspect of the present invention, there can be provided an ink jet recording apparatus to be used in the above-mentioned ink jet recording method.

EXAMPLES

The present invention is described in more detail below by way of Examples and Comparative Examples. However, the present invention is by no means limited to Examples below without departing from the gist of the present invention. "Part(s)" and "%" with regard to the description of the amounts of components are by mass, unless otherwise stated.

<Preparation of Aqueous Dispersion Liquid of Resin Particles>

(Aqueous Dispersion Liquid of Resin Particles 1)

A reaction vessel having a stirring device mounted thereto was set in a hot water bath. 1,178 Parts of water was placed in the reaction vessel, and the internal temperature was held at 70° C. 219.0 Parts of styrene, 233.0 parts of acrylonitrile, and 14.0 parts of a reactive surfactant (product name "ADEKA REASOAP SR-10", manufactured by Adeka Corporation) were mixed to prepare a monomer mixed liquid for a core portion. In addition, 1.9 parts of potassium persulfate and 659 parts of water were mixed to prepare an aqueous solution 1 of a polymerization initiator. The monomer mixed liquid for a core portion and the aqueous solution 1 of a polymerization initiator were dropped in parallel into the reaction vessel over 60 minutes. After the completion of dropping, stirring was continued to further perform the reaction for 30 minutes, to thereby synthesize particles each serving as a core portion of resin particles.

Then, 15.2 parts of styrene, 12.0 parts of methacrylic acid, 32.0 parts of ethylene glycol dimethacrylate, 20.0 parts of ethylene glycol diglycidyl ether, and 0.8 part of a reactive surfactant were mixed to prepare a monomer mixed liquid for a shell portion. EX-810 (product name "DENACOL EX-810", manufactured by Nagase ChemteX Corporation) was used as ethylene glycol diglycidyl ether. In addition, the reactive surfactant is the same kind as that used for synthesis of the core portion. 0.1 Part of potassium persulfate and 133 parts of water were mixed to prepare an aqueous solution 2 of a polymerization initiator. The monomer mixed liquid for a shell portion and the aqueous solution 2 of a polymerization initiator were dropped in parallel into the reaction vessel containing the particles each serving as a core portion over 10 minutes. After the completion of dropping, stirring was performed to continue the reaction at 80° C. for 10 minutes, to thereby synthesize a shell portion. Thus, resin particles each having a core-shell structure in which the particles each serving as a core portion were covered with the resin serving as a shell portion were synthesized.

After that, an appropriate amount of 8 mol/L potassium hydroxide aqueous solution was added to the reaction vessel to adjust the pH of the liquid to 8.5. Further, 23.2 parts of C.I. Basic Red 1 (powder) and 5.8 parts of C.I. Basic Violet 11 (powder) were added to the resultant, and the temperature was raised to 80° C. Then, the resultant was stirred for 2 hours to dye the resin particles with the fluorescent dyes. Subsequently, an appropriate amount of 8 mol/L potassium hydroxide aqueous solution was added to the reaction vessel to adjust the pH of the liquid to 8.5. An appropriate amount of water was further added to the resultant to provide an aqueous dispersion liquid of resin particles 1 in which the content of the resin particles was 20.0%. The particle diameter (volume-based cumulative 50% particle diameter) of the resultant resin particles 1 was 80 nm. The particle diameter of the resin particles was measured with a particle size analyzer of a dynamic light scattering system (product name "UPA-EX 150", manufactured by Nikkiso Co., Ltd.) under the conditions of SetZero: 30 seconds, number of measurements: 3, measurement time: 180 seconds, shape: spherical shape, and refractive index: 1.59.

(Preparation of Aqueous Dispersion Liquid of Resin Particles 2)

A reaction vessel having a stirring device mounted thereto was set in a hot water bath. 1,178 Parts of water was placed in the reaction vessel, and the internal temperature was held at 70° C. 256.6 Parts of styrene, 273.0 parts of acrylonitrile, and 16.4 parts of a reactive surfactant (product name "ADEKA REASOAP SR-10", manufactured by Adeka Corporation) were mixed to prepare a monomer mixed liquid. In addition, 1.9 parts of potassium persulfate and 659 parts of water were mixed to prepare an aqueous solution 3 of a polymerization initiator. The monomer mixed liquid and the aqueous solution 3 of a polymerization initiator were dropped in parallel into the reaction vessel over 60 minutes. After the completion of dropping, stirring was continued to further perform the reaction for 30 minutes, to thereby synthesize particles.

After that, an appropriate amount of 8 mol/L potassium hydroxide aqueous solution was added to the reaction vessel to adjust the pH of the liquid to 8.5. Further, 23.2 parts of C.I. Basic Red 1 (powder) and 5.8 parts of C.I. Basic Violet 11 (powder) were added to the resultant, and the temperature was raised to 80° C. Then, the resultant was stirred for 2 hours to dye the resin particles with the fluorescent dyes. Subsequently, an appropriate amount of 8 mol/L potassium hydroxide aqueous solution was added to the reaction vessel to adjust the pH of the liquid to 8.5. An appropriate amount of water was further added to the resultant to provide an aqueous dispersion liquid of resin particles 2 in which the content of the resin particles was 20.0%. The particle diameter (volume-based cumulative 50% particle diameter) of the resultant resin particles 2 measured in the same manner as in the resin particles 1 was 80 nm.

(Preparation of Aqueous Dispersion Liquid of Resin Particles 3)

Polyester resin particles (polyester resin particles 1) were prepared with reference to the method as described in Japanese Patent Application Laid-Open No. 2020-50874. An aqueous dispersion liquid of resin particles 3 colored with a basic dye in which the content of the resin particles was 20.0% was obtained in the same manner as in the aqueous dispersion liquid of resin particles 1 described above except that the prepared polyester resin particles were used. The particle diameter (volume-based cumulative 50% particle diameter) of the resin particles 3 measured in the same manner as in the resin particles 1 was 80 nm.

(Preparation of Aqueous Dispersion Liquid of Resin Particles 4)

29.0 Parts of C.I. Disperse Red 58 (powder) was used instead of C.I. Basic Red 1 (powder) and C.I. Basic Violet 11 (powder). An aqueous dispersion liquid of resin particles 4 in which the content of the resin particles was 20.0% was obtained in the same manner as in the aqueous dispersion liquid of resin particles 2 described above except for the foregoing. The C.I. Disperse Red 58 used does not correspond to the "basic dye exhibiting fluorescence". The particle diameter (volume-based cumulative 50% particle diameter) of the resin particles 4 measured in the same manner as in the resin particles 1 was 80 nm.

<Preparation of Dye Aqueous Solution>

C.I. Basic Red 1 was dissolved in water at 80° C. to prepare an aqueous solution of C.I. Basic Red 1 (content of a fluorescent dye: 10.0%). Further, C.I. Basic Violet 11 was dissolved in water at 80° C. to prepare an aqueous solution of C.I. Basic Violet 11 (content of a fluorescent dye: 10.0%). In addition, the concentration of a commercially available dye aqueous solution (product name "Projet Fast Black 2", manufactured by FUJIFILM Corporation) was adjusted to prepare an aqueous solution of Projet Fast Black 2 in which the content of the dye was 10.0%.

<Preparation of Pigment Dispersion Liquid>

(Pigment Dispersion Liquid 1)

A solution in which 70.6 mmol of concentrated hydrochloric acid was dissolved in 5.5 g of water was cooled to a temperature of 5° C., and 9.8 mmol of 4-aminophthalic acid was added to the solution. A container storing the resultant solution was placed in an ice bath, and the solution was stirred to be brought into a state in which the solution was always kept at 10° C. or less. A solution in which 24.9 mmol of sodium nitrite was dissolved in 9.0 g of water at 5° C. was added to the resultant. After further stirring for 15 minutes, 6.0 g of a pigment was added to the resultant under stirring. Carbon black (product name "Black Pearls 880", manufactured by Cabot Corporation) was used as the pigment. After that, the resultant was further stirred for 15 minutes to provide a slurry. The resultant slurry was filtered through filter paper (product name "Standard Filter Paper No. 2", manufactured by Advantec Co., Ltd.), washed sufficiently with water, and dried in an oven at 110° C. to provide a self-dispersion pigment. The content of the pigment was adjusted through use of ion-exchanged water to provide a pigment dispersion liquid 1. The pigment dispersion liquid 1 contained the self-dispersion pigment in which a phthalic acid group with a counter ion thereof being a sodium ion was bonded to the particle surface, and the content of the pigment was 10.0%.

(Pigment Dispersion Liquid 2)

10.0 Parts of a pigment, 20.0 parts of an aqueous solution of a resin dispersant (content of a resin (solid content): 20.0%), and 70.0 parts of ion-exchanged water were mixed to provide a mixture. As the pigment, carbon black (product name "Black Pearls 880", manufactured by Cabot Corporation) was used. In addition, as the aqueous solution of the resin dispersant, an aqueous solution obtained by dissolving a styrene-acrylic acid copolymer (weight-average molecular weight: 10,000, acid value: 200 mgKOH/g) that was a water-soluble resin in ion-exchanged water through use of sodium hydroxide that was equimolar to the acid value of the resin was used. The resultant mixture was dispersed for 3 hours through use of a batch-type vertical sand mill and then filtered under pressure through a microfilter (manufactured by FUJIFILM Corporation) having a pore size of 1.2 μm. Then, the content of the pigment was adjusted by adding ion-exchange water to provide a pigment dispersion liquid 2. The pigment dispersion liquid 2 contained the pigment dispersed by the water-soluble resin (resin dispersant). The content of the pigment was 10.0%, and the content of the water-soluble resin was 4.0%.

<Preparation of Aqueous Solution of Acrylic Resin>

Monomers of kinds and amounts shown in Table 1 were polymerized by a conventional method to synthesize water-soluble acrylic resins 1 to 5 that were random copolymers. Anionic groups were each neutralized by adding water containing sodium hydroxide that was equimolar to the acid value of each of the resins. After that, an appropriate amount of water was further added to provide an aqueous solution of each of the acrylic resins in which the content of the resin was 10.0%. The resultant acrylic resins were each dissolved in tetrahydrofuran to prepare samples for measurement. The acid value of each of the samples for measurement was measured by potentiometric titration through use of a potentiometric automatic titration device (product name "AT510", manufactured by Kyoto Electronics Manufacturing Co., Ltd.) and a potassium hydroxide ethanol titration solution. In addition, the weight-average molecular weight in terms of polystyrene measured by GPC was 25,000 for each of the samples. Abbreviations St, BzMA, nBA, and MAA in Table 1 represent styrene, benzyl methacrylate, n-butyl acrylate, and methacrylic acid, respectively.

TABLE 1

Synthesis Conditions and Characteristics of Acrylic Resin

| Acrylic resin | Monomer (part(s)) | | | | Acid value (mgKOH/g) |
|---|---|---|---|---|---|
| | St | BzMA | nBA | MAA | |
| 1 | 60.0 | | 21.6 | 18.4 | 120 |
| 2 | 87.7 | | | 12.3 | 80 |
| 3 | 67.8 | | | 32.2 | 210 |
| 4 | | 60.0 | 21.6 | 18.4 | 120 |
| 5 | | | 81.6 | 18.4 | 120 |

<Preparation of Aqueous Solution of Urethane Resin>

41.9 Parts of polypropylene glycol having a number-average molecular weight of 2,000 was dissolved in methyl ethyl ketone. Then, 46.1 parts of isophorone isocyanate and 12.0 parts of dimethylol propionic acid were added to the resultant, and the mixture was reacted at 75° C. for 1 hour to provide a urethane prepolymer solution. The resultant urethane prepolymer solution was cooled to 60° C., and then water containing potassium hydroxide that was equimolar to the acid value of the solution was added to neutralize carboxylic acid groups. The resultant was cooled to 40° C., and ion-exchanged water was added thereto, followed by stirring with a homomixer at a high speed to emulsify the resultant. 2.1 Parts of ethylenediamine was added to the resultant, and a chain extension reaction was performed at 30° C. for 12 hours. After the absence of isocyanate groups was recognized by FT-IR, methyl ethyl ketone was distilled off by heating and decompression to provide an aqueous solution of a urethane resin in which the content of the resin was 20.0%. The weight-average molecular weight of the urethan resin 1 measured by the same method as that of the acrylic resin was 30,000, and the acid value thereof was 50 mgKOH/g.

<Preparation of Ink>

Respective components (unit: %) shown in the upper columns of each of Table 2-1 to Table 2-3 were mixed, stirred sufficiently, and then filtered under pressure through a microfilter (manufactured by FUJIFILM Corporation) having a pore size of 3.0 μm to prepare each ink. In the tables, "hydantoin" is 1,3-bis(2-hydroxyethyl)-5,5-dimethyl hydantoin. In the lower columns of each of Table 2-1 to Table 2-3, ink characteristics are shown. The product names of surfactants used for preparation of each ink are as described below.

Surfynol 465 (product name, manufactured by Evonik Operations GmbH): nonionic hydrocarbon-based surfactant BYK3420, BYK348, and BYK3456 (product names, manufactured by BYK-Chemie GmbH): nonionic silicone-based surfactants Capstone FS-3100 (product name, manufactured by Chemours): nonionic fluorine-based surfactant

TABLE 2-1

| Composition and Characteristics of Ink | Ink | | | | | | | | |
|---|---|---|---|---|---|---|---|---|---|
| | 1 | 2 | 3 | 4 | 5 | 6 | 7 | 8 | 9 |
| Aqueous dispersion liquid of resin particles 1 | 25.0 | | 25.0 | 25.0 | 25.0 | 25.0 | 25.0 | 25.0 | 25.0 |
| Aqueous dispersion liquid of resin particles 2 | | 25.0 | | | | | | | |
| Aqueous dispersion liquid of resin particles 3 | | | | | | | | | |
| Aqueous dispersion liquid of resin particles 4 | | | | | | | | | |
| Aqueous solution of C.I. Basic Red 1 | | | | | | | | | |
| Aqueous solution of C.I. Basic Violet 11 | | | | | | | | | |
| Aqueous solution of Projet Fast Black 2 | | | | | | | | | |
| Pigment dispersion liquid 1 | | | | | | | | | |
| Pigment dispersion liquid 2 | | | | | | | | | |
| Aqueous solution of acrylic resin 1 | 17.5 | 17.5 | | | | | 17.5 | 17.5 | 17.5 |
| Aqueous solution of acrylic resin 2 | | | 17.5 | | | | | | |
| Aqueous solution of acrylic resin 3 | | | | 17.5 | | | | | |
| Aqueous solution of acrylic resin 4 | | | | | 17.5 | | | | |
| Aqueous solution of acrylic resin 5 | | | | | | | | | |
| Aqueous solution of urethane resin | | | | | | 17.5 | | | |
| Hydantoin | 10.0 | 10.0 | 10.0 | 10.0 | 10.0 | 10.0 | 10.0 | | 10.0 |
| Glycerin | | | | | | | | 10.0 | |
| 1,2-Hexanediol | 3.0 | 3.0 | 3.0 | 3.0 | 3.0 | 3.0 | 3.0 | 3.0 | 3.0 |
| 2-Methyl-1,3-propanediol | 7.0 | 7.0 | 7.0 | 7.0 | 7.0 | 7.0 | | 7.0 | 7.0 |
| 1,2-Butanediol | | | | | | | 7.0 | | |
| Surfynol 465 | 0.5 | 0.5 | 0.5 | 0.5 | 0.5 | 0.5 | 0.5 | 0.5 | 0.5 |
| BYK3420 | 0.1 | 0.1 | 0.1 | 0.1 | 0.1 | 0.1 | 0.1 | 0.1 | |
| Capstone FS-3100 | | | | | | | | | 0.1 |
| BYK348 | | | | | | | | | |
| BYK3456 | | | | | | | | | |
| Ion-exchanged water | 36.9 | 36.9 | 36.9 | 36.9 | 36.9 | 36.9 | 36.9 | 36.9 | 36.9 |
| Content A (%) of resin particles | 5.00 | 5.00 | 5.00 | 5.00 | 5.00 | 5.00 | 5.00 | 5.00 | 5.00 |
| Content B (%) of water-soluble resin | 3.50 | 3.50 | 3.50 | 3.50 | 3.50 | 3.50 | 3.50 | 3.50 | 3.50 |
| Value (times) of B/A | 0.7 | 0.7 | 0.7 | 0.7 | 0.7 | 0.7 | 0.7 | 0.7 | 0.7 |

TABLE 2-2

| Composition and Characteristics of Ink | Ink | | | | | | | | | |
|---|---|---|---|---|---|---|---|---|---|---|
| | 10 | 11 | 12 | 13 | 14 | 15 | 16 | 17 | 18 | 19 |
| Aqueous dispersion liquid of resin particles 1 | 25.0 | 25.0 | 25.0 | 25.0 | 25.0 | 25.0 | 37.5 | 25.0 | 25.0 | |
| Aqueous dispersion liquid of resin particles 2 | | | | | | | | | | |

TABLE 2-2-continued

Composition and Characteristics of Ink

| | Ink | | | | | | | | | |
|---|---|---|---|---|---|---|---|---|---|---|
| | 10 | 11 | 12 | 13 | 14 | 15 | 16 | 17 | 18 | 19 |
| Aqueous dispersion liquid of resin particles 3 | | | | | | | | | | 25.0 |
| Aqueous dispersion liquid of resin particles 4 | | | | | | | | | | |
| Aqueous solution of C.I. Basic Red 1 | | | | | | | | | | |
| Aqueous solution of C.I. Basic Violet 11 | | | | | | | | | | |
| Aqueous solution of Projet Fast Black 2 | | | | | | | | | | |
| Pigment dispersion liquid 1 | | | | | | | | | | |
| Pigment dispersion liquid 2 | | | | | | | | | | |
| Aqueous solution of acrylic resin 1 | 17.5 | 17.5 | 2.2 | 2.5 | 10.0 | 12.5 | 17.5 | 50.0 | | 17.5 |
| Aqueous solution of acrylic resin 2 | | | | | | | | | | |
| Aqueous solution of acrylic resin 3 | | | | | | | | | | |
| Aqueous solution of acrylic resin 4 | | | | | | | | | | |
| Aqueous solution of acrylic resin 5 | | | | | | | | | 17.5 | |
| Aqueous solution of urethane resin | | | | | | | | | | |
| Hydantoin | 10.0 | 10.0 | 10.0 | 10.0 | 10.0 | 10.0 | 10.0 | 10.0 | 10.0 | 10.0 |
| Glycerin | | | | | | | | | | |
| 1,2-Hexanediol | 3.0 | 3.0 | 3.0 | 3.0 | 3.0 | 3.0 | 3.0 | 3.0 | 3.0 | 3.0 |
| 2-Methyl-1,3-propanediol | 7.0 | 7.0 | 7.0 | 7.0 | 7.0 | 7.0 | 7.0 | 7.0 | 7.0 | 7.0 |
| 1,2-Butanediol | | | | | | | | | | |
| Surfynol 465 | 0.5 | 0.5 | 0.5 | 0.5 | 0.5 | 0.5 | 0.5 | 0.5 | 0.5 | 0.5 |
| BYK3420 | | | 0.1 | 0.1 | 0.1 | 0.1 | 0.1 | 0.1 | 0.1 | 0.1 |
| Capstone FS-3100 | | | | | | | | | | |
| BYK348 | 0.1 | | | | | | | | | |
| BYK3456 | | 0.1 | | | | | | | | |
| Ion-exchanged water | 36.9 | 36.9 | 52.2 | 51.9 | 44.4 | 41.9 | 24.4 | 4.4 | 36.9 | 36.9 |
| Content A (%) of resin particles | 5.00 | 5.00 | 5.00 | 5.00 | 5.00 | 5.00 | 7.50 | 5.00 | 5.00 | 5.00 |
| Content B (%) of water-soluble resin | 3.50 | 3.50 | 0.44 | 0.50 | 2.00 | 2.50 | 3.50 | 10.00 | 3.50 | 3.50 |
| Value (times) of B/A | 0.7 | 0.7 | 0.09 | 0.10 | 0.4 | 0.5 | 0.5 | 2.0 | 0.7 | 0.7 |

TABLE 2-3

Composition and Characteristics of Ink

| | Ink | | | | | | | |
|---|---|---|---|---|---|---|---|---|
| | 20 | 21 | 22 | 23 | 24 | 25 | 26 | 27 |
| Aqueous dispersion liquid of resin particles 1 | | | 25.0 | | | | | |
| Aqueous dispersion liquid of resin particles 2 | | | | | | | | |
| Aqueous dispersion liquid of resin particles 3 | 25.0 | 25.0 | | | | | | |
| Aqueous dispersion liquid of resin particles 4 | | | | 25.0 | | | | |
| Aqueous solution of C.I. Basic Red 1 | | | | | 40.0 | | | |
| Aqueous solution of C.I. Basic Violet 11 | | | | | 10.0 | | | |
| Aqueous solution of Projet Fast Black 2 | | | | | | 23.0 | | |
| Pigment dispersion liquid 1 | | | | | | | 50.0 | |
| Pigment dispersion liquid 2 | | | | | | | | 50.0 |
| Aqueous solution of acrylic resin 1 | | | | 17.5 | 17.5 | 17.5 | 17.5 | 17.5 |
| Aqueous solution of acrylic resin 2 | | | | | | | | |
| Aqueous solution of acrylic resin 3 | | | | | | | | |
| Aqueous solution of acrylic resin 4 | | | | | | | | |
| Aqueous solution of acrylic resin 5 | 1.5 | 2.2 | | | | | | |
| Aqueous solution of urethane resin | | | | | | | | |

TABLE 2-3-continued

Composition and Characteristics of Ink

| | Ink | | | | | | | |
|---|---|---|---|---|---|---|---|---|
| | 20 | 21 | 22 | 23 | 24 | 25 | 26 | 27 |
| Hydantoin | 10.0 | 10.0 | 10.0 | 10.0 | 10.0 | 10.0 | 10.0 | 10.0 |
| Glycerin | | | | | | | | |
| 1,2-Hexanediol | 3.0 | 3.0 | 3.0 | 3.0 | 3.0 | 3.0 | 3.0 | 3.0 |
| 2-methyl-1,3-propanediol | 7.0 | 7.0 | 7.0 | 7.0 | 7.0 | 7.0 | 7.0 | 7.0 |
| 1,2-Butanediol | | | | | | | | |
| Surfynol 465 | 0.5 | 0.5 | 0.5 | 0.5 | 0.5 | 0.5 | 0.5 | 0.5 |
| BYK3420 | 0.1 | 0.1 | 0.1 | 0.1 | 0.1 | 0.1 | 0.1 | 0.1 |
| Capstone FS-3100 | | | | | | | | |
| BYK348 | | | | | | | | |
| BYK3456 | | | | | | | | |
| Ion-exchanged water | 52.9 | 52.2 | 54.4 | 36.9 | 11.9 | 38.9 | 11.9 | 11.9 |
| Content A (%) of resin particles | 5.00 | 5.00 | 5.00 | 5.00 | 0.00 | 0.00 | 0.00 | 0.00 |
| Content B (%) of water-soluble resin | 0.30 | 0.44 | 0.00 | 3.50 | 3.50 | 3.50 | 3.50 | 5.50 |
| Value (times) of B/A | 0.06 | 0.09 | 0.0 | 0.7 | — | — | — | — |

<Evaluation>

An ink jet recording apparatus, which had a configuration of a main part illustrated in FIG. 1 and had incorporated thereinto an ink supply system having a configuration illustrated in FIG. 2 and a pressure recovery mechanism including a sub-tank illustrated in FIG. 3, was prepared. This recording apparatus is a recording apparatus of a serial system in which the recording unit 102 having the recording head 203 incorporated thereinto and having the sub-tank 202 mounted thereon is mounted on the carriage 103. As the tube (ink supply tube 104) that connects the main tank 201 and the sub-tank 202 to each other, a tube formed of a styrene-based thermoplastic elastomer, having an inner diameter of 2 mm and an outer diameter of 4 mm, was used. The ink storage amount of the main tank was set to 150 mL, and the ink storage amount of the sub-tank was set to 7 mL. In Examples, the recording duty of a solid image recorded under such a condition that two ink droplets having a mass per droplet of 5 ng are applied to a unit region measuring 1/600 inch by 1/600 inch is defined as 100%. Each of the following items was evaluated through use of the apparatus. In the present invention, in the following evaluation criteria, the levels "AA", "A", and "B" were defined as acceptable levels, while the level "C" was defined as an unacceptable level. The evaluation results are shown in Table 3.

(Color Developability)

The prepared ink was injected into the main tank of the above-mentioned ink jet recording apparatus, and the ink was supplied to the sub-tank and the recording head. Then, the pressure was adjusted to a predetermined pressure while being monitored, and the recovery operation shown in Table 3 was performed. After that, a solid image having a recording duty of 100% was recorded on a recording medium (glossy paper, product name "Canon Photo Paper/Glossy Pro (Platinum Grade) PT-201", manufactured by Canon Inc.). After the recorded image was dried for one day, chroma (C*) and lightness (L*) in a Lab color system were measured with a spectrocolorimeter (product name "X-Rite eXact" (M1 light source), manufactured by X-Rite Inc.). Then, the color developability of the image was evaluated based on the following evaluation criteria. In Examples, the color developability was not evaluated for the ink using a black coloring material because such ink did not exhibit fluorescence.

A: Chroma was 30 or more and lightness was 50 or more.

C: Chroma was less than 30 or lightness was less than 50.

(Ejection Property after Recovery Operation)

The prepared ink was injected into the main tank of the above-mentioned ink jet recording apparatus, and the ink was supplied to the sub-tank and the recording head. After that, the pressure was adjusted to a predetermined pressure while being monitored, and the recovery operation shown in Table 3 was performed. After that, a solid image having a recording duty of 50% was recorded on the entire surface of A4 size plain paper (product name "GF-500", manufactured by Canon Inc.). The recorded solid image was visually recognized, and the ejection property after the recovery operation was evaluated based on the following evaluation criteria.

AA: No unevenness was recognized in the solid image.

A: Unevenness was recognized in a region of 5% or less with respect to the total area of the solid image.

B: Unevenness was recognized in a region of more than 5% and 10% or less with respect to the total area of the solid image.

C: Unevenness was recognized in a region of more than 10% with respect to the total area of the solid image.

(Ejection Recoverability)

The prepared ink was injected into the main tank of the above-mentioned ink jet recording apparatus, and the ink was supplied to the sub-tank and the recording head. After that, the pressure was adjusted to a predetermined pressure while being monitored, and the recovery operation shown in Table 3 was performed. After that, an evaluation pattern for recognizing whether or not an ink was normally ejected from each nozzle was recorded on A4 size plain paper (product name "GF-500", manufactured by Canon Inc.). As the evaluation pattern, a ruled line pattern having ruled lines with multiple line widths in a paper conveying direction and a width direction, respectively is used. The following cycle was performed: a solid image of 1.6 cm×5 cm having a recording duty of 1% was recorded, and then a nozzle check pattern was recorded until the evaluation pattern became a normal state (in which an ink was able to be normally ejected from all the ejection orifices). Then, the ejection recoverability was evaluated from the number of sheets on which the nozzle check pattern was recorded based on the following evaluation criteria.

AA: When the solid image was recorded on one sheet, the nozzle check pattern was recovered to a normal state.

A: When the solid image was recorded on two sheets, the nozzle check pattern was recovered to a normal state.

B: When the solid image was recorded on three sheets, the nozzle check pattern was recovered to a normal state.

C: It was required to record the solid image on four or more sheets for recovering the nozzle check pattern to a normal state.

TABLE 3

Evaluation Conditions and Evaluation Results

| | | Ink | Recovery operation | Pressure (kPa) | Color developability | Ejection property after recovery operation | Ejection recoverability |
|---|---|---|---|---|---|---|---|
| Example | 1 | 1 | Pressure | 40 | A | AA | AA |
| | 2 | 2 | Pressure | 40 | A | AA | AA |
| | 3 | 3 | Pressure | 40 | A | AA | AA |
| | 4 | 4 | Pressure | 40 | A | AA | AA |
| | 5 | 5 | Pressure | 40 | A | AA | AA |
| | 6 | 6 | Pressure | 40 | A | AA | AA |
| | 7 | 7 | Pressure | 40 | A | AA | AA |
| | 8 | 8 | Pressure | 40 | A | AA | AA |
| | 9 | 9 | Pressure | 40 | A | AA | AA |
| | 10 | 10 | Pressure | 40 | A | AA | AA |
| | 11 | 11 | Pressure | 40 | A | AA | AA |
| | 12 | 1 | Pressure | 15 | A | AA | B |
| | 13 | 1 | Pressure | 20 | A | AA | A |
| | 14 | 1 | Pressure | 80 | A | AA | A |
| | 15 | 12 | Pressure | 40 | A | A | A |
| | 16 | 13 | Pressure | 40 | A | AA | A |
| | 17 | 14 | Pressure | 40 | A | AA | A |
| | 18 | 15 | Pressure | 40 | A | AA | AA |
| | 19 | 16 | Pressure | 40 | A | AA | AA |
| | 20 | 17 | Pressure | 40 | A | AA | A |
| | 21 | 18 | Pressure | 40 | A | A | AA |
| | 22 | 19 | Pressure | 40 | A | A | AA |
| | 23 | 20 | Pressure | 15 | A | B | B |
| | 24 | 21 | Pressure | 15 | A | B | B |
| Comparative | 1 | 22 | Suction | — | A | C | C |
| Example | 2 | 22 | Pressure | 40 | A | C | C |
| Reference | 1 | 1 | Suction | — | A | — | AA |
| Example | 2 | 23 | Pressure | 40 | C | AA | AA |
| | 3 | 24 | Pressure | 40 | C | — | AA |
| | 4 | 25 | Pressure | 40 | — | — | AA |
| | 5 | 26 | Pressure | 40 | — | — | AA |
| | 6 | 27 | Pressure | 40 | — | — | AA |

In Reference Example 1 in which the recovery operation by suction was performed, the flow of an ink was weak, and hence non-ejection did not occur after the recovery operation. However, a period of time required for the recovery operation was long, and the amount of an ink to be discarded by the recovery operation was increased. In Reference Example 2 using a fluorescent dye that did not correspond to the "basic dye exhibiting fluorescence", the level of color developability was insufficient. In addition, in Reference Examples 3 to 6 in which a fluorescent dye was not used, non-ejection did not occur after the recovery operation, but the level of color developability was insufficient.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-098877, filed Jun. 20, 2022, and Japanese Patent Application No. 2023-097946, filed Jun. 14, 2023, which are hereby incorporated by reference herein in their entirety.

What is claimed is:

1. An ink jet recording method comprising recording an image on a recording medium through use of an ink jet recording apparatus, the inkjet recording apparatus comprising:

an aqueous ink;

a recording head including an ink flow path in which the aqueous ink flows and including an ejection orifice configured to eject the aqueous ink;

an ink storage portion configured to form a recording unit with the recording head;

a pump configured to be connectable to the ink storage portion; and a recovery mechanism configured to recover an ejection state of the aqueous ink from the ejection orifice by applying pressure to the ink flow path inside the recording head by means of the pump, wherein the aqueous ink contains resin particles each dyed with a basic dye exhibiting fluorescence and a water-soluble resin, wherein the resin particles are each formed of a resin having an anionic group-containing unit, wherein the water-soluble resin has an anionic group-containing unit; and wherein the recovery mechanism is configured to recover the ejection state of the aqueous ink from the ejection orifice by applying pressure from an upstream side of the ink flow path inside the recording head toward the ejection orifice by means of the pump.

2. The ink jet recording method according to claim 1, wherein the pressure applied to the ink flow path is 20 kPa or more.

3. The ink jet recording method according to claim 1, wherein the pressure applied to the ink flow path is 40 kPa or more.

4. The ink jet recording method according to claim 1, wherein the aqueous ink has a mass ratio of a content (% by mass) of the water-soluble resin to a content (% by mass) of the resin particles of 0.1 times or more.

5. The ink jet recording method according to claim 1, wherein the aqueous ink has a mass ratio of a content (% by mass) of the water-soluble resin to a content (% by mass) of the resin particles of 0.5 times or more.

6. The ink jet recording method according to claim 1, wherein the water-soluble resin further has an aromatic group-containing unit.

7. The ink jet recording method according to claim 1, wherein the resin particles are each formed of an acrylic resin.

8. The ink jet recording method according to claim 1, wherein the recovery mechanism is configured to recover the ejection state of the aqueous ink from the ejection orifice by applying pressure to the ink flow path inside the recording head through application of pressure to the ink storage portion by means of the pump.

9. The ink jet recording method according to claim 1, wherein the inkjet recording apparatus further comprises a sack-shaped bag accommodated in the ink storage portion, and wherein the recovery mechanism is configured to recover the ejection state of the aqueous ink from the ejection orifice by applying pressure to the ink flow path inside the recording head through application of pressure to the ink storage portion by injecting pressurized air into the sack-shaped bag by means of the pump.

10. The ink jet recording method according to claim 1, wherein the inkjet recording apparatus further comprises a first ink storage portion, and wherein, when the ink storage portion configured to form a recording unit with the recording head is a second ink storage portion, the second ink storage portion is connected to the first ink storage portion through an ink supply tube and is configured to be supplied with the ink from the first ink storage portion.

11. An inkjet recording apparatus comprising:

an aqueous ink;

a recording head including an ink flow path in which the aqueous ink flows and including an ejection orifice configured to eject the aqueous ink;

an ink storage portion configured to form a recording unit with the recording head;

a pump configured to be connectable to the ink storage portion; and a recovery mechanism configured to recover an ejection state of the aqueous ink from the ejection orifice by applying pressure to the ink flow path in the recording head by means of the pump, wherein the aqueous ink contains resin particles each dyed with a basic dye exhibiting fluorescence and a water-soluble resin, wherein the resin particles are each formed of a resin having an anionic group-containing unit, wherein the water-soluble resin has an anionic group-containing unit; and wherein the recovery mechanism is configured to recover the ejection state of the aqueous ink from the ejection orifice by applying pressure from an upstream side of the ink flow path inside the recording head toward the ejection orifice by means of the pump.

* * * * *